(12) United States Patent
Maziewski et al.

(10) Patent No.: US 10,657,983 B2
(45) Date of Patent: May 19, 2020

(54) AUTOMATIC GAIN CONTROL FOR SPEECH RECOGNITION

(71) Applicant: Intel Corporation, Santa Clara, CA (US)

(72) Inventors: Przemyslaw Maziewski, Gdansk (PL); Adam Kupryjanow, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 321 days.

(21) Appl. No.: 15/388,107

(22) Filed: Dec. 22, 2016

(65) Prior Publication Data

US 2017/0365274 A1    Dec. 21, 2017

Related U.S. Application Data

(60) Provisional application No. 62/350,507, filed on Jun. 15, 2016.

(51) Int. Cl.

| | | |
|---|---|---|
| *G10L 21/034* | (2013.01) | |
| *H04R 1/04* | (2006.01) | |
| *G10L 21/0364* | (2013.01) | |
| *G10L 25/21* | (2013.01) | |
| *G10L 15/20* | (2006.01) | |

(Continued)

(52) U.S. Cl.
CPC ............ *G10L 21/034* (2013.01); *G10L 15/20* (2013.01); *G10L 15/22* (2013.01); *G10L 21/0216* (2013.01); *G10L 21/0232* (2013.01); *G10L 21/0364* (2013.01); *G10L 25/21* (2013.01); *G10L 25/51* (2013.01); *H04R 1/04* (2013.01); *H04R 1/406* (2013.01); *H04R 31/006* (2013.01); *G10L 15/30* (2013.01); *G10L 2021/02082* (2013.01); *G10L 2021/02166* (2013.01); *H04R 1/2876* (2013.01); *H04R 3/005* (2013.01);
(Continued)

(58) Field of Classification Search
CPC ........ G10L 15/20; G10L 15/22; G10L 21/034
USPC ......................................................... 704/225
See application file for complete search history.

(56) References Cited

U.S. PATENT DOCUMENTS

| | | | | |
|---|---|---|---|---|
| 5,852,804 A | * | 12/1998 | Sako | ................... B60R 16/0373 |
| | | | | 704/275 |
| 6,122,331 A | * | 9/2000 | Dumas | ................. H03G 3/3089 |
| | | | | 375/345 |

(Continued)

FOREIGN PATENT DOCUMENTS

| | | |
|---|---|---|
| CN | 109074816 | 12/2018 |
| EP | 2879402 | 6/2015 |

(Continued)

OTHER PUBLICATIONS

"International Application Serial No. PCT/US2017/032913, International Search Report dated Aug. 21, 2017", 3 pgs.

(Continued)

*Primary Examiner* — Shaun Roberts
(74) *Attorney, Agent, or Firm* — Schwegman Lundberg & Woessner, P.A.

(57) ABSTRACT

System and techniques for automatic gain control for speech recognition are described herein. An audio signal may be obtained. A signal-to-noise ratio (SNR) may be derived from the audio signal. The SNR may be compared to a threshold. A stored gain value may be updated when the SNR is beyond the threshold and the stored gain value may be applied to a descendant (e.g., later) of the audio signal otherwise.

24 Claims, 5 Drawing Sheets

(51) Int. Cl.
  *G10L 15/22* (2006.01)
  *G10L 21/0232* (2013.01)
  *G10L 25/51* (2013.01)
  *H04R 1/40* (2006.01)
  *H04R 31/00* (2006.01)
  *G10L 21/0216* (2013.01)
  *H04R 3/00* (2006.01)
  *G10L 21/0208* (2013.01)
  *H04R 1/28* (2006.01)
  *G10L 15/30* (2013.01)

(52) U.S. Cl.
  CPC .. *H04R 2201/401* (2013.01); *H04R 2201/403* (2013.01); *H04R 2420/07* (2013.01)

(56) References Cited

U.S. PATENT DOCUMENTS

| | | | |
|---|---|---|---|
| 6,314,394 B1 * | 11/2001 | Finn | G10L 21/0208 381/94.2 |
| 6,314,396 B1 * | 11/2001 | Monkowski | G10L 15/20 704/233 |
| 6,453,289 B1 * | 9/2002 | Ertem | G10L 21/0208 704/225 |
| 6,581,031 B1 * | 6/2003 | Ito | G10L 19/08 704/207 |
| 6,636,829 B1 * | 10/2003 | Benyassine | G10L 19/005 704/201 |
| 6,778,954 B1 * | 8/2004 | Kim | G10L 21/0208 704/226 |
| 7,098,865 B2 | 8/2006 | Christensen et al. | |
| 7,602,931 B2 | 10/2009 | Akino et al. | |
| 8,144,881 B2 * | 3/2012 | Crockett | H03G 3/3089 381/56 |
| 8,149,728 B2 * | 4/2012 | Kim | H04R 29/004 370/252 |
| 8,243,951 B2 | 8/2012 | Ishibashi et al. | |
| 8,861,756 B2 | 10/2014 | Zhu et al. | |
| 8,903,106 B2 | 12/2014 | Meyer et al. | |
| 9,124,234 B1 * | 9/2015 | Petrovic | H03G 3/3078 |
| 9,390,723 B1 | 7/2016 | McDonough, Jr. et al. | |
| 9,456,276 B1 | 9/2016 | Chhetri | |
| 9,754,605 B1 | 9/2017 | Chhetri | |
| 9,800,279 B2 * | 10/2017 | Gore | H04B 1/16 |
| 9,843,851 B2 | 12/2017 | Chamberlin et al. | |
| 2003/0026437 A1 | 2/2003 | Janse | |
| 2004/0150558 A1 | 8/2004 | Li et al. | |
| 2004/0170283 A1 * | 9/2004 | Terada | H04M 9/082 381/66 |
| 2004/0170284 A1 | 9/2004 | Janse | |
| 2004/0190730 A1 | 9/2004 | Rui | |
| 2005/0154584 A1 * | 7/2005 | Jelinek | G10L 19/00 704/219 |
| 2005/0195988 A1 | 9/2005 | Tashev et al. | |
| 2008/0130801 A1 * | 6/2008 | Wang | H03G 3/3036 375/345 |
| 2008/0201137 A1 | 8/2008 | Vos | |
| 2008/0292108 A1 | 11/2008 | Buck et al. | |
| 2009/0210227 A1 * | 8/2009 | Sugiyama | G10L 15/22 704/246 |
| 2009/0220109 A1 | 9/2009 | Crockett et al. | |
| 2010/0073216 A1 | 3/2010 | Sakamoto et al. | |
| 2010/0278352 A1 | 11/2010 | Petit | |
| 2011/0026733 A1 * | 2/2011 | Li | G10L 21/0208 381/94.1 |
| 2011/0158418 A1 | 6/2011 | Bai et al. | |
| 2011/0164760 A1 | 7/2011 | Horibe et al. | |
| 2011/0188671 A1 * | 8/2011 | Anderson | H04B 15/00 381/94.3 |
| 2012/0023061 A1 | 1/2012 | Stephenson et al. | |
| 2012/0076311 A1 * | 3/2012 | Isabelle | G10L 21/0208 381/57 |
| 2012/0099732 A1 | 4/2012 | Visser | |
| 2012/0106749 A1 | 5/2012 | Buck et al. | |
| 2012/0288100 A1 | 11/2012 | Cho | |
| 2012/0322511 A1 | 12/2012 | Parrot | |
| 2014/0274218 A1 | 9/2014 | Kadiwala et al. | |
| 2014/0286497 A1 | 9/2014 | Thyssen et al. | |
| 2015/0078571 A1 | 3/2015 | Kurylo et al. | |
| 2015/0117672 A1 | 4/2015 | Christoph | |
| 2015/0126255 A1 | 5/2015 | Yang et al. | |
| 2015/0181328 A1 * | 6/2015 | Gupta | H04R 3/005 381/56 |
| 2016/0142620 A1 | 5/2016 | Sawa et al. | |
| 2017/0064441 A1 | 3/2017 | Kanamori et al. | |
| 2017/0218128 A1 | 8/2017 | Kawai et al. | |
| 2017/0264999 A1 | 9/2017 | Fukuda et al. | |
| 2017/0365255 A1 | 12/2017 | Kupryjanow et al. | |
| 2017/0365271 A1 | 12/2017 | Kupryjanow et al. | |
| 2017/0366897 A1 | 12/2017 | Azarewicz et al. | |

FOREIGN PATENT DOCUMENTS

| | | |
|---|---|---|
| WO | 03010996 | 2/2003 |
| WO | 2016056683 | 4/2016 |
| WO | 2017218128 | 12/2017 |
| WO | 2017218129 | 12/2017 |

OTHER PUBLICATIONS

"International Application Serial No. PCT/US2017/032913, Written Opinion dated Aug. 21, 2017", 5 pgs.

"International Application Serial No. PCT/US2017/032932, International Search Report dated Aug. 25, 2017", 4 pgs.

"International Application Serial No. PCT/US2017/032932, Written Opinion dated Aug. 25, 2017", 4 pgs.

Ante, Juki, "Group sparsity for MIMO speech dereverberation", In 2015 IEEE Workshop on Applications of Signal Processing to Audio and Acoustics (WASPAA 2015), (Oct. 2015), 18-21.

Armin, Sehr, "Towards Robust Distant-Talking Automatic Speech Recognition in Reverberant Environments", Speech and Audio Processing in Adverse Environments Part V, (2008), 679-728.

Takuya, Yoshika, "Generalization of Multi-Channel Linear Prediction Methods for Blind MIMO Impulse Response Shortening", IEEE Transactions on Audio Speech and Language Processing vol. 20 No. 10, (Dec. 2012), 2707-2720.

Takuya, Yoshioka, "Dereverberation for reverberation-robust microphone arrays", In Proceedings of the 21st European Signal Processing Conference (EUSIPCO 2013), (Sep. 2013), 1-5.

Zixing, Zhang, "Channel Mapping using Bidirectional Long Short-Term Memory for Dereverheration in Hands-Free Voice Controlled Device", IEEE Transactions on Consumer Electronics vol. 60 No. 03, (Aug. 2014), 525-533.

"U.S. Appl. No. 15/388,275, Response filed Apr. 9, 2018 to Non Final Office Action dated Jan. 9, 2018", 8 pgs.

"U.S. Appl. No. 15/388,275, Non Final Office Action dated Jan. 9, 2018", 15 pgs.

"U.S. Appl. No. 15/388,323, Non Final Office Action dated Feb. 11, 2019", 16 pgs.

"U.S. Appl. No. 15/388,147, Non Final Office Action dated Feb. 21, 2019", 8 pgs.

"International Application Serial No. PCT US2017 032913, International Preliminary Report on Patentability dated Dec. 27, 2018", 7 pgs.

"International Application Serial No. PCT US2017 032932, International Preliminary Report on Patentability dated Dec. 27, 2018", 9 pgs.

"U.S. Appl. No. 15/388,275, Final Office Action dated Jul. 5, 2018", 17 pgs.

"U.S. Appl. No. 15/388,323, Response filed May 13, 2019 to Non Final Office Action dated Feb. 11, 2019", 14 pgs.

"U.S. Appl. No. 15/388,147, Response filed May 21, 2019 to Non Final Office Action dated Feb. 21, 2019", 10 pgs.

"U.S. Appl. No. 15/388,323, Final Office Action dated May 28, 2019", 18 pgs.

"U.S. Appl. No. 15/388,147, Final Office Action dated Aug. 20, 2019", 8 pgs.

(56) References Cited

OTHER PUBLICATIONS

Woudenberg, "A Block Least Squares Approach to Acoustic Echo Cancellation", ICASSP '99, Proceedings, 1999 IEEE International Conference on Acoustics, Speech, and Signal Processing, (Apr. 1999), 869-872.

"European Application Serial No. 17813753.5, Extended European Search Report dated Jan. 13, 2020", 9 pgs.

* cited by examiner

AUTOMATIC GAIN CONTROL FOR SPEECH RECOGNITION

CLAIM OF PRIORITY

This patent application claims the benefit of priority, under 35 U.S.C. § 119, to U.S. Provisional Application Ser. No. 62/350,507, titled "FAR FIELD AUTOMATIC SPEECH RECOGNITION" and filed on Jun. 15, 2016, the entirety of which is hereby incorporated by reference herein.

TECHNICAL FIELD

Embodiments described herein generally relate to automatic speech recognition (ASR) and more specifically to automatic gain control for speech recognition.

BACKGROUND

ASR involves a machine-based collection of techniques to understand human languages. ASR is interdisciplinary, often involving microphone, analog to digital conversion, frequency processing, database, and artificial intelligence technologies to convert the spoken word into textual or machine readable representations of not only what said (e.g., a transcript) but also what was meant (e.g., semantic understanding) by a human speaker. Far field ASR involves techniques to decrease a word error rate (WER) in utterances made a greater distance to a microphone, or microphone array, than traditionally accounted for in ASR processing pipelines. Such distance often decreases the signal to noise (SNR) ration and thus increases WER in traditional ASR systems. As used herein, far field ASR involves distances more than a half meter from the microphone.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Embodiments and examples herein general described a number of systems, devices, and techniques for automatic gain control for speech recognition. It is understood, however, that the systems, devices, and techniques are examples illustrating the underlying concepts.

Figure 1:
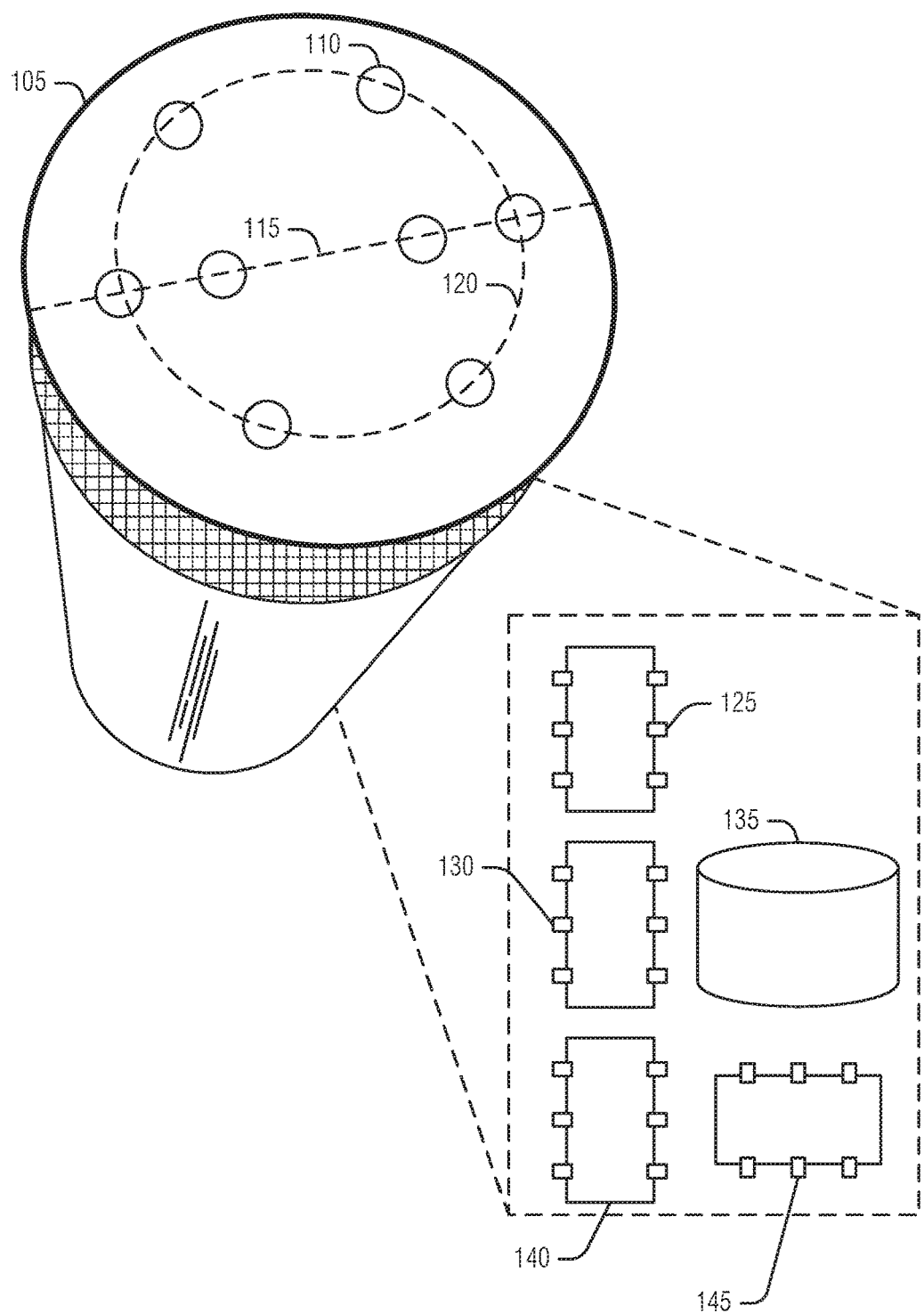
FIG. 1 is an example of a smart home gateway housing including a system for automatic gain control for speech recognition, according to an embodiment.

FIG. 1 is an example of a smart home gateway housing 105, according to an embodiment. As illustrated, the circles atop the housing are lumens 110 behind which are housed microphones (as illustrated there are eight microphones). The dashed lines illustrate microphones in a linear arrangement 115 as well as in a circular arrangement 120. Many of the examples described herein operate with these dual arrangements (e.g., linear 115 and circular 120) with respect to a device 105.

Automatic speech recognition (ASR) often performs poorly if the user (or other sound source) is changing positions in the so-called far field (FF) (e.g., up to five meters away from the microphone array). For example, for distances changing from one half to five meters the ASR word error rate (WER) for traditional techniques often grows from 4% to 18.5%. Among many factors contributing to this performance drop, some speech signal quality degradation due to gain changes may play an important role. The system includes a dedicated automated gain control (AGC) block. The AGC block may automatically counteract gain changes and keep the speech signal level independent of user distance from the device. The described AGC block and implemented technique was proven to work correctly for FF ASR.

The AGC operates by updating, but not applying, gain during periods in which the signal-to-noise ratio (SNR) is high (e.g., presumably user speech) and refraining from otherwise. In this manner, increasing noise does negatively impact changing the gain. When SNR is low (e.g., more noise) the most recent gain value may be applied to the signal to help reduce the noise. In this manner, FF ASR is enhanced. In an example, the gain may be subject to a smoothing function, for example, in time to avoid gain changes oscillating, skipping, or otherwise jumping unpredictably.

The dedicated AGC may include a sampler 125, a signal processor 130, a comparator 140, and a controller 145. Each of these components are implemented in electronic hardware, such as that described below (e.g., circuits).

The sampler 125 is arranged to obtain an audio signal. Thus, the sampler 125 may be a part of a microphone array, have a tap on microphone output, or have the audio signal delivered via a device. In an example, the audio signal is divided into frames. In an example, the frames are sequential.

The signal processor 130 is arranged to receive the audio signal from the sampler 125 and to derive an SNR from the audio signal. In an example, to derive the SNR from the audio signal, the signal processor 130 calculates a noise floor power spectral density (NFPSD) and the speech level power spectral density (SLPDS). In an example, both PSDs are limited to a speech frequency bandwidth. Thus, interference beyond speech bandwidth, such as the running of an engine, squawking bird, etc., will not impact it. In an example, the speech frequency bandwidth is defined by set of frequency bin parameters, b_min representing a lower frequency bin and b_max representing a higher frequency bin, the PSDs applied to frequency bins between b_min and b_max inclusively. In an example, to derive the SNR, the signal processor 130 subtracts the noise floor PSD from the signal level PSD, where:

$$\text{signal } level_{PSD} = \frac{\sum_{b=b_{min}}^{b_{max}} 10\log_{10}(Mag(b))}{SCL} \text{ with}$$

-continued $$Mag(b) = |FFT(TF)|^2$$

$$Scl = \left(\frac{N}{2}\right)^2$$

In an example, the signal processor 130 is arranged to the full-wave rectifier in combination with an auto-regressive averager to obtain a peak signal level (PSL). In an example, signal amplitudes used for obtaining the PSL are scaled by a gain determined by processing a previous signal frame.

The comparator 140 is arranged to compare the SNR to a threshold. In an example, the comparator 140 may obtain the threshold from the data store 135. In an example, the threshold is selected from a plurality of thresholds. In an example, the threshold is selected based on a device including a microphone array to produce the audio signal. Thus, the device and microphone arrangement illustrated in FIG. 1 has a first threshold while another device, such as a cellular telephone with a single microphone has a second threshold in the plurality of thresholds.

The controller 145 may be communicatively coupled to a data store 135 during operation. In an example, to update the stored gain value, the controller 145 stores a previous value of the gain plus a current gain headroom value. In an example, the current gain headroom value is a negative of a peak signal level (PSL) for a current frame minus a constant gain headroom margin.

The described AGC block updates the gain in periods with high signal-to-noise-ratio (SNR). In an example, the gain is not updated in periods with low signal to noise ratio; high and low defined by relation to a threshold. Time filtering may be applied to smooth the gain changes. Then the updated gain is applied during low SNR periods. Additionally, in an example, the gain is kept at a highest possible level to allow momentary clipping. This has been shown to improve the FF ASR performance for some engines (e.g. Cortana).

Typically, processing pipelines used with ASR engines are either missing an AGC or reusing an AGC designed to serve different use-cases, such as voice over IP (VoIP) communication. The described AGC block is tailored for better FF ASR performance. The efficacy of this technique is illustrated in the experimental results shown in the table below.

TABEL 1

The FF (5m) ASR (Cortana) performance boost due the proposed AGC algorithm

| Scenario No | Processing applied before the ASR | WER [%] |
|---|---|---|
| 1 | Constant microphone gain | 13.46 |
| 2 | Proposed AGC | 8.46 |
| 3 | The FF pre-processing pipeline without the AGC | 3.26 |
| 4 | The FF pre-processing pipeline with the AGC described herein | 2.96 |

The table above presents results from raw signal processing (scenario 1) as well as ones coming from the AGC (scenario 2) described herein. Additionally, the AGC described here may accompany other processing blocks (e.g., the FF pipeline). In such an example, the processing done with the accompanying AGC leads to better results (scenario 4). In all cases, using the described AGC allows to achieve lower WERs.

Figure 2:
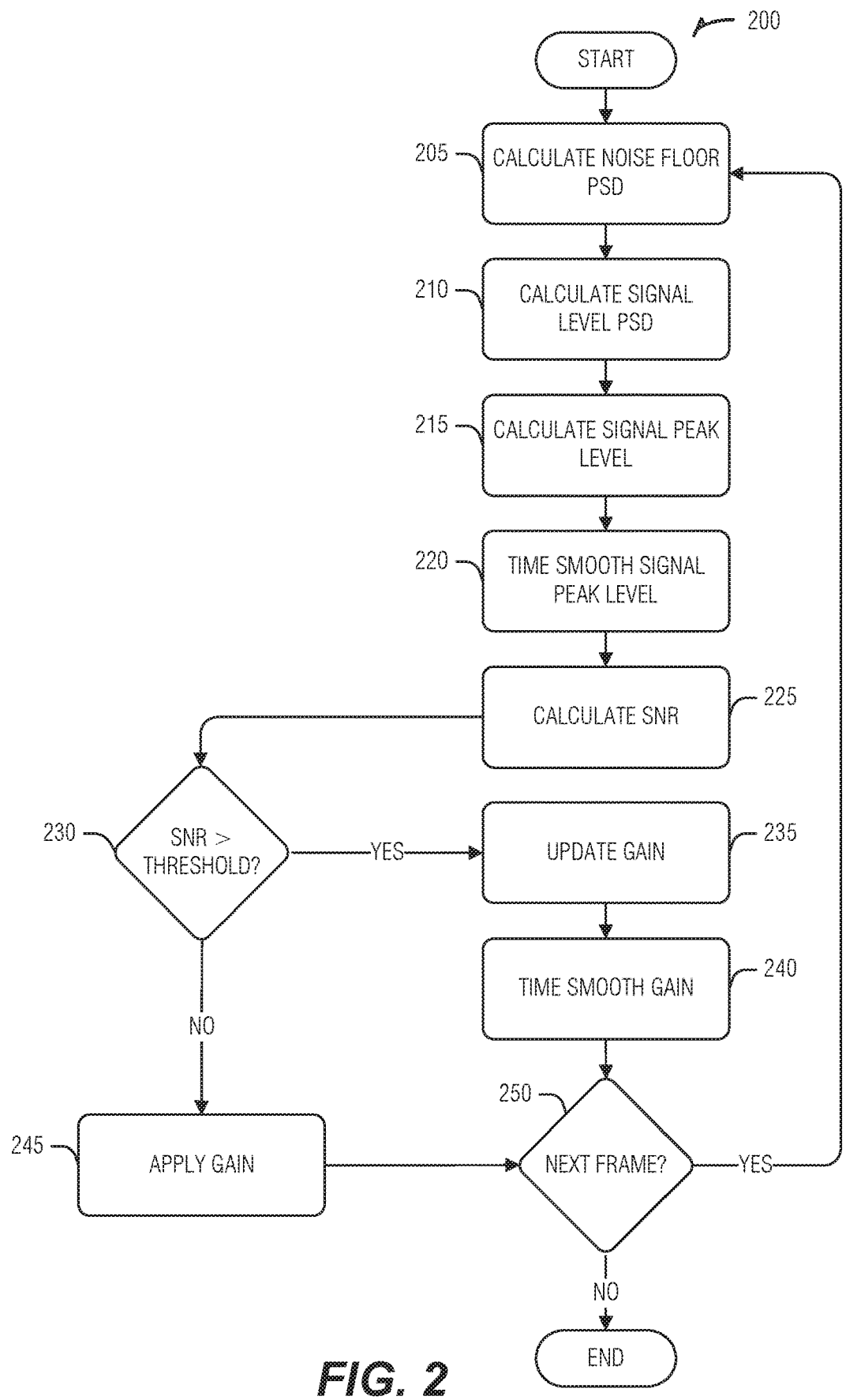
FIG. 2 illustrates am example of an automatic gain control method, according to an embodiment.

FIG. 2 illustrates an example of an AGC method 200, according to an embodiment. The method 200 may be implemented by the AGC block described above. The method 200 works after dividing the digitized microphone signal into small (e.g. 10 ms) time frames. The frames may overlap.

At operation 205, for each consecutive frame, the noise floor (NFPSD) is estimated and scaled to decibels (dB). Here different approaches may be applied. One approach that has been shown to work with the method 200 is the noise power spectral density (PSD) estimator [see e.g., R. Martin's "Noise Power Spectral Density Estimation Based on Optimal Smoothing and Minimum Statistics" paper from 2001]. However, in the method 200 the estimator may be limited to the speech frequency bandwidth. This may be accomplished by calculating all PSDs in the range of $<b_{min}, b_{max}>$, where $b_{min}$ represents a lower bound and $b_{max}$ an upper bound for a frequency bin (e.g., window) covering the speech bandwidth. For example, for sampling rate equaling 16 kHz, speech bandwidth ranging from 100 Hz to 5000 Hz, and the Fast Fourier Transform (FFT) size (N) equaling 512 samples, the $b_{min}=3$ and $b_{max}=160$.

At operation 210, the overall signal level may be calculated as the PSD estimate of the currently analyzed time-frame (TF). This may be done according to the following formula:

$$SL_{PSD} = \frac{\sum_{b=b_{min}}^{b_{max}} 10\log_{10}(Mag(b))}{Scl}$$

$$Mag(b) = |FFT(TF)|^2$$

$$Scl = \left(\frac{N}{2}\right)^2$$

where:
b—represents the frequency bin; and
N—represents the fast Fourier transform (FFT) size.

In operations 215 and 220, the peak signal level (PSL) may be calculated and time-smoothed respectively. Here the full-wave rectifier in combination with an AR-averager with short attack time (e.g., 0.38 ms) may be used. However, the time frame used for the PSL calculation may be scaled by the gain calculated for the previously processed time frame.

At operation 225, the SNR level may be calculated by:

$$SNR = SL_{PSD} - NF_{PSD}$$

At decision 230, the SNR level may be check against a threshold. The threshold may be tuned depending on the particular properties of the device to which the AGC was ported. For example, ranges from 10 dB to 30 dB are possible. If the SNR is greater than the threshold, the method 200 moves on to operation 235, else the method 200 moves on to operation 245.

At operation 235, the gain value (G) may be updated according to the formula below:

$$G_i = G_{i-1} + HDR_i$$

$$HDR_i = -PSL_i - HDR_{margin}$$

where:
i—represents the number (e.g., index) of the currently processed time frame;
HDRi—represents the gain headroom for the i-th frame (i.e. amplification which may be applied to the frame without overloading the amplitude); and HDRmargin—safety margin preventing the overloading which may happen otherwise due to the time smoothing of the PSL values.

At operation 240, the updated gain may be time-smoothed to limit abrupt variations. Here the exponentially time averaging routine from sound level metering may be used with, for example, the averaging time equaling 5 ms.

Figure 3:
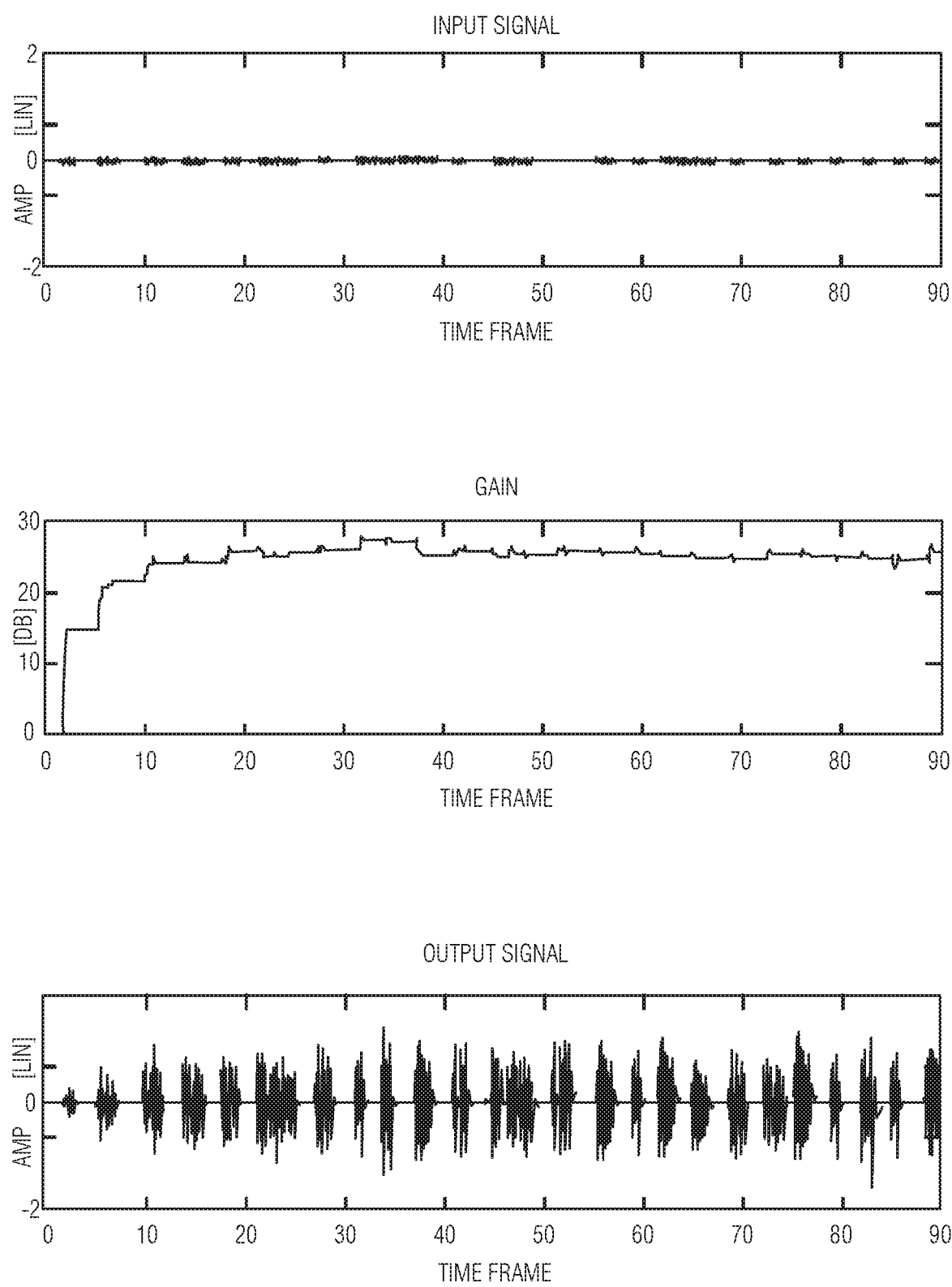
FIG. 3 illustrates example results using the automatic gain control described herein.

At operation 245, which may be executed only at low SNR periods in an example, the latest gain may be applied. In this scenario, the gain is stable in the noisy parts of the signal. If there are more frames to process (decision 250), the method 200 begins with the next frame at operation 205, else the method 200 ends. The effect of gain application (e.g., applying the gain), together with the gain values is represented in FIG. 3. FIG. 3 illustrates results generated using the method 200, with: an input signal in the upper plot; gain values computed using the method 200 in the middle plot; and the resulting signal obtained by scaling the input with the computed gain in the lower plot.

Figure 4:
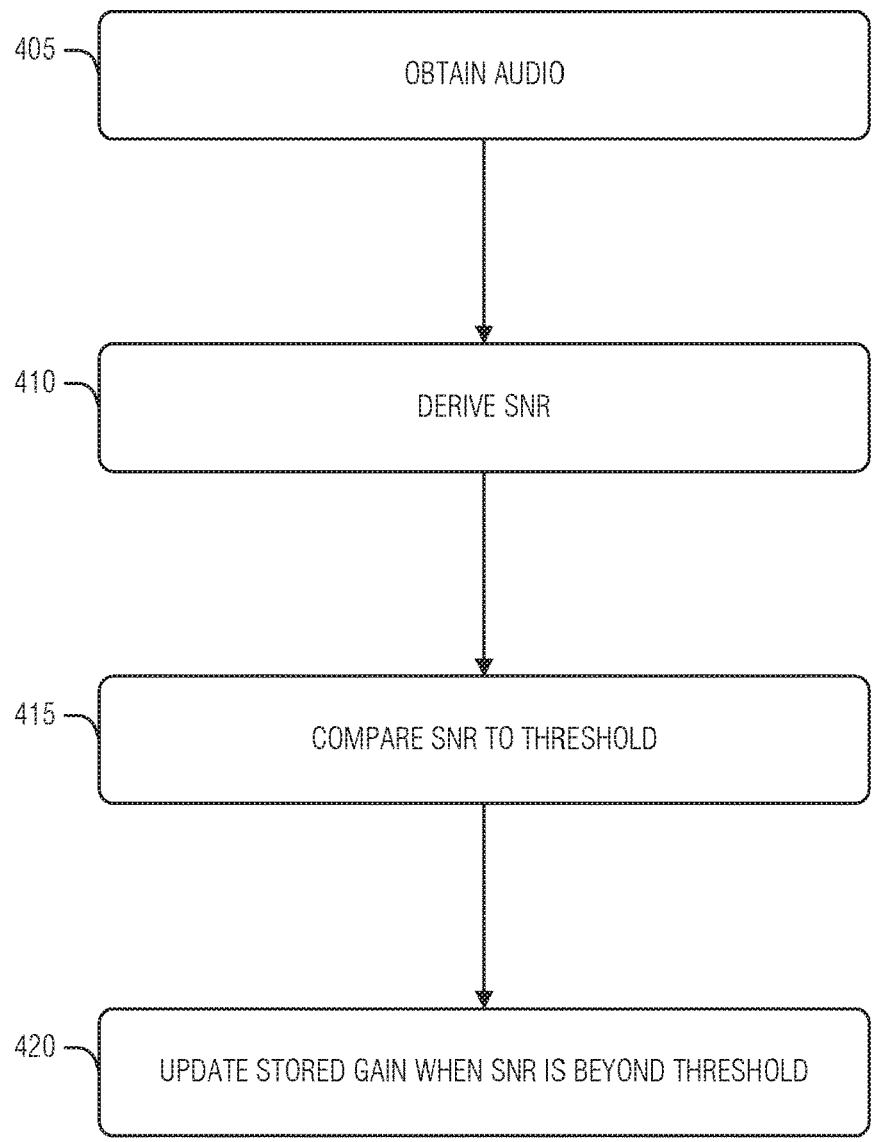
FIG. 4 illustrates an example of a method for automatic gain control for speech recognition, according to an embodiment.

FIG. 4 illustrates an example of a method 400 for automatic gain control for speech recognition, according to an embodiment. The operations of the method 400 are implemented in electronic hardware, such as that described above and below (e.g., circuits).

At operation 405, an audio signal is obtained.

At operation 410, an SNR is derived from the audio signal. In an example, deriving the SNR from the audio signal includes calculating a noise floor power spectral density (NFPSD) and the speech level power spectral density (SLPDS). In an example, both PSDs are limited to a speech frequency bandwidth. In an example, the speech frequency bandwidth is defined by set of frequency bin parameters, b_min representing a lower frequency bin and b_max representing a higher frequency bin, the PSDs applied to frequency bins between b_min and b_max inclusively. In an example, deriving the SNR includes subtracting the NFPSD from the SLPSD.

In an example, wherein deriving the available gain headroom includes using the full-wave rectifier in combination with an auto-regressive averager to obtain a peak signal level (PSL). In an example, signal amplitudes used for obtaining the PSL are scaled by a gain determined by processing a previous signal frame.

At operation 415, the SNR is compared to a threshold. In an example, the threshold is selected from a plurality of thresholds. In an example, the threshold is selected based on a device including a microphone array to produce the audio signal.

At operation 420, a stored gain value is updated when the SNR is beyond the threshold. In an example, updating the stored gain value includes storing a previous value of the gain plus a current gain headroom value. In an example, the current gain headroom value is a negative of a peak signal level (PSL) for a current frame minus a constant gain headroom margin.

If the SNR is not beyond the threshold (operation 420), the stored gain value is not modified. Instead the stored gain value is applied to a descendant of the audio signal (e.g., a later sample in a continuous stream).

In an example, the operations 405, 410, 415, and 420 are applied to sample frames from the audio signal. In an example, the application of the operations to the sample frames is sequential (e.g., in time).

Figure 5:
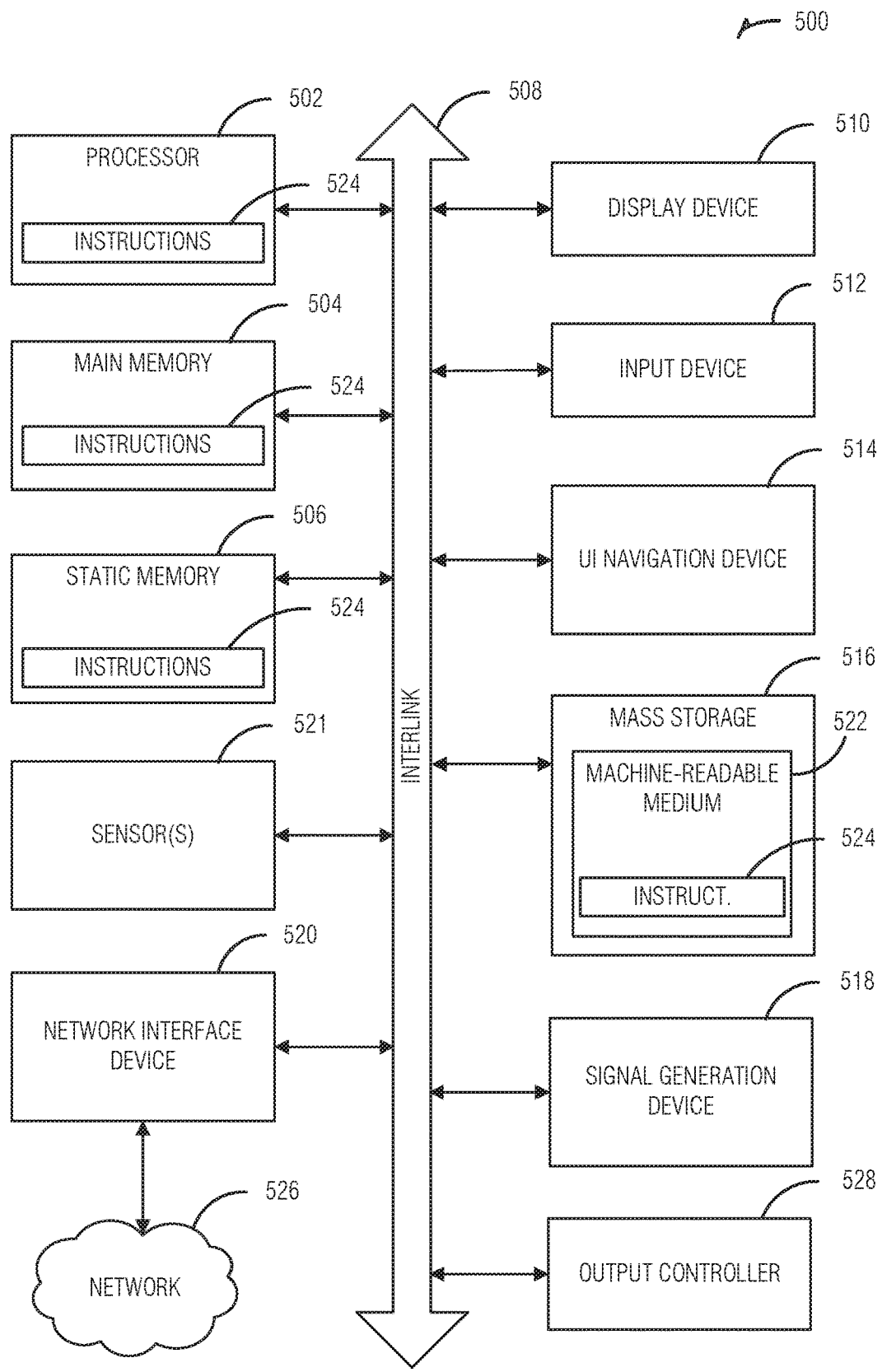
FIG. 5 is a block diagram illustrating an example of a machine upon which one or more embodiments may be implemented.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Additional Notes & Examples

Example 1 is a system for automatic gain control for speech recognition, the system comprising: a sampler to obtain an audio signal; a signal processor to derive a signal-to-noise ratio (SNR) from the audio signal; a comparator to compare the SNR to a threshold; and a controller to: update a stored gain value when the SNR is beyond the threshold; and apply the stored gain value to a descendant of the audio signal when the SNR is not beyond the threshold.

In Example 2, the subject matter of Example 1 optionally includes wherein the sampler, signal processor, comparator, and controller operate on sample frames from the audio signal.

In Example 3, the subject matter of Example 2 optionally includes wherein the sample frames are sequential.

In Example 4, the subject matter of any one or more of Examples 1-3 optionally include wherein, to derive the SNR from the audio signal, the signal processor calculates a noise floor power spectral density (PSD).

In Example 5, the subject matter of Example 4 optionally includes wherein the PSD is limited to a speech frequency bandwidth.

In Example 6, the subject matter of Example 5 optionally includes wherein the speech frequency bandwidth is defined by set of frequency bin parameters, b_min representing a lower frequency bin and b_max representing a higher frequency bin, the PSD applied to frequency bins between b_min and b_max inclusively.

In Example 7, the subject matter of any one or more of Examples 4-6 optionally include wherein the signal processor is to derive available gain headroom from the audio signal including using a full-wave rectifier in combination with an auto-regressive average to obtain a peak signal level (PSL).

In Example 8, the subject matter of Example 7 optionally includes wherein a time frame for obtaining the PSD is scaled by a gain determined by processing a previous signal frame.

In Example 9, the subject matter of any one or more of Examples 1-8 optionally include wherein the threshold is selected from a plurality of thresholds.

In Example 10, the subject matter of Example 9 optionally includes wherein the threshold is selected based on a device including a microphone array to produce the audio signal.

In Example 11, the subject matter of any one or more of Examples 1-10 optionally include wherein, to update the stored gain value, the controller stores a previous value of the gain plus a current gain headroom value.

In Example 12, the subject matter of Example 11 optionally includes wherein the current gain headroom value is a negative of a peak signal level (PSL) for a current frame minus a constant gain headroom margin.

Example 13 is at least one machine readable medium including instructions for automatic gain control for speech recognition, the instructions, when executed by a machine, cause the machine to perform operations comprising: obtaining an audio signal; deriving a signal-to-noise ratio (SNR) from the audio signal; comparing the SNR to a threshold; and updating a stored gain value when the SNR is beyond the threshold and applying the stored gain value to a descendant of the audio signal otherwise.

In Example 14, the subject matter of Example 13 optionally includes wherein the operations of obtaining the audio signal, deriving the SNR, comparing the SNR to the threshold, and updating the stored gain value or applying the stored gain value are applied for sample frames from the audio signal.

In Example 15, the subject matter of Example 14 optionally includes wherein the application to the sample frames is sequential.

In Example 16, the subject matter of any one or more of Examples 13-15 optionally include wherein deriving the SNR from the audio signal includes calculating a noise floor power spectral density (PSD) and a speech level PSD.

In Example 17, the subject matter of Example 16 optionally includes wherein the PSDs are limited to a speech frequency bandwidth.

In Example 18, the subject matter of Example 17 optionally includes wherein the speech frequency bandwidth is defined by set of frequency bin parameters, b_min representing a lower frequency bin and b_max representing a higher frequency bin, the PSD applied to frequency bins between b_min and b_max inclusively.

In Example 19, the subject matter of any one or more of Examples 16-18 optionally include wherein the operations include deriving an available gain headroom including using a full-wave rectifier in combination with an auto-regressive average to obtain a peak signal level (PSL).

In Example 20, the subject matter of Example 19 optionally includes wherein a time frame for obtaining the PSD is scaled by a gain determined by processing a previous signal frame.

In Example 21, the subject matter of any one or more of Examples 13-20 optionally include wherein the threshold is selected from a plurality of thresholds.

In Example 22, the subject matter of Example 21 optionally includes wherein the threshold is selected based on a device including a microphone array to produce the audio signal.

In Example 23, the subject matter of any one or more of Examples 13-22 optionally include wherein updating the stored gain value includes storing a previous value of the gain plus a current gain headroom value.

In Example 24, the subject matter of Example 23 optionally includes wherein the current gain headroom value is a negative of a peak signal level (PSL) for a current frame minus a constant gain headroom margin.

Example 25 is a method for automatic gain control for speech recognition, the method comprising: obtaining an audio signal; deriving a signal-to-noise ratio (SNR) from the audio signal; comparing the SNR to a threshold; and updating a stored gain value when the SNR is beyond the threshold and applying the stored gain value to a descendant of the audio signal otherwise.

In Example 26, the subject matter of Example 25 optionally includes wherein the operations of obtaining the audio signal, deriving the SNR, comparing the SNR to the threshold, and updating the stored gain value or applying the stored gain value are applied for sample frames from the audio signal.

In Example 27, the subject matter of Example 26 optionally includes wherein the application to the sample frames is sequential.

In Example 28, the subject matter of any one or more of Examples 25-27 optionally include wherein deriving the SNR from the audio signal includes calculating a noise floor power spectral density (PSD) and a speech level PSD.

In Example 29, the subject matter of Example 28 optionally includes wherein the PSDs are limited to a speech frequency bandwidth.

In Example 30, the subject matter of Example 29 optionally includes wherein the speech frequency bandwidth is defined by set of frequency bin parameters, b_min representing a lower frequency bin and b_max representing a higher frequency bin, the PSD applied to frequency bins between b_min and b_max inclusively.

In Example 31, the subject matter of any one or more of Examples 28-30 optionally include deriving an available gain headroom including using a full-wave rectifier in combination with an auto-regressive average to obtain a peak signal level (PSL).

In Example 32, the subject matter of Example 31 optionally includes wherein a time frame for obtaining the PSD is scaled by a gain determined by processing a previous signal frame.

In Example 33, the subject matter of any one or more of Examples 25-32 optionally include wherein the threshold is selected from a plurality of thresholds.

In Example 34, the subject matter of Example 33 optionally includes wherein the threshold is selected based on a device including a microphone array to produce the audio signal.

In Example 35, the subject matter of any one or more of Examples 25-34 optionally include wherein updating the stored gain value includes storing a previous value of the gain plus a current gain headroom value.

In Example 36, the subject matter of Example 35 optionally includes wherein the current gain headroom value is a negative of a peak signal level (PSL) for a current frame minus a constant gain headroom margin.

Example 37 is a system including means to implement any of methods 25-36.

Example 38 is at least one machine readable medium including instructions that, when executed by a machine, cause the machine to perform any of methods 25-36.

Example 39 is a system for automatic gain control for speech recognition, the system comprising: means for obtaining an audio signal; means for deriving a signal-to-noise ratio (SNR) from the audio signal; means for comparing the SNR to a threshold; and means for updating a stored gain value when the SNR is beyond the threshold and applying the stored gain value to a descendant of the audio signal otherwise.

In Example 40, the subject matter of Example 39 optionally includes wherein the operations of obtaining the audio signal, deriving the SNR, comparing the SNR to the threshold, and updating the stored gain value or applying the stored gain value are applied for sample frames from the audio signal.

In Example 41, the subject matter of Example 40 optionally includes wherein the application to the sample frames is sequential.

In Example 42, the subject matter of any one or more of Examples 39-41 optionally include wherein the means for deriving the SNR from the audio signal includes means for calculating a noise floor power spectral density (PSD) and speech level PSD.

In Example 43, the subject matter of Example 42 optionally includes wherein the PSDs are limited to a speech frequency bandwidth.

In Example 44, the subject matter of Example 43 optionally includes wherein the speech frequency bandwidth is defined by set of frequency bin parameters, b_min representing a lower frequency bin and b_max representing a higher frequency bin, the PSD applied to frequency bins between b_min and b_max inclusively.

In Example 45, the subject matter of any one or more of Examples 42-44 optionally include means for deriving an available gain headroom including using a full-wave rectifier in combination with an auto-regressive average to obtain a peak signal level (PSL).

In Example 46, the subject matter of Example 45 optionally includes wherein a time frame for obtaining the PSD is scaled by a gain determined by processing a previous signal frame.

In Example 47, the subject matter of any one or more of Examples 39-46 optionally include wherein the threshold is selected from a plurality of thresholds.

In Example 48, the subject matter of Example 47 optionally includes wherein the threshold is selected based on a device including a microphone array to produce the audio signal.

In Example 49, the subject matter of any one or more of Examples 39-48 optionally include wherein the means for updating the stored gain value includes means for storing a previous value of the gain plus a current gain headroom value.

In Example 50, the subject matter of Example 49 optionally includes wherein the current gain headroom value is a negative of a peak signal level (PSL) for a current frame minus a constant gain headroom margin.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for automatic gain control for speech recognition, the system comprising:
   a sampler to obtain an audio signal;
   a signal processor to derive a signal-to-noise ratio (SNR) from the audio signal;
   a comparator to compare the SNR to a threshold; and
   a controller to:
      update a single stored gain value and refrain from applying the stored gain value when the SNR is beyond the threshold, wherein, to update the gain value, the controller stores a time-smoothed result of an addition of a gain headroom value and a previous gain value for each consecutive frame from the audio signal when the SNR is beyond the threshold; and
      apply the updated stored gain value to a descendant of the audio signal when the SNR is not beyond the threshold, wherein the controller does not update the stored gain value when the SNR is not beyond the threshold.

2. The system of claim 1, wherein, to derive the SNR from the audio signal, the signal processor calculates a noise floor power spectral density (PSD).

3. The system of claim 2, wherein the PSD is limited to a speech frequency bandwidth.

4. The system of claim 3, wherein the speech frequency bandwidth is defined by set of frequency bin parameters, b_min representing a lower frequency bin and b_max representing a higher frequency bin, the PSD applied to frequency bins between b_min and b_max inclusively.

5. The system of claim 2, wherein the signal processor is to derive available gain headroom from the audio signal including using a full-wave rectifier in combination with an auto-regressive average to obtain a peak signal level (PSL).

6. The system of claim 5, wherein a time frame for obtaining the PSD is scaled by a gain determined by processing a previous signal frame.

7. The system of claim 1, wherein, to update the stored gain value, the controller stores a previous value of the gain plus a current gain headroom value.

8. At least one non-transitory machine readable medium including instructions for automatic gain control for speech recognition, the instructions, when executed by a machine, cause the machine to perform operations comprising:
   obtaining an audio signal;
   deriving a signal-to-noise ratio (SNR) from the audio signal;

comparing the SNR to a threshold;
updating a single stored gain value and refraining from applying the updated stored gain value when the SNR is beyond the threshold, wherein updating the stored gain value includes storing a time-smoothed result of an addition of a gain headroom value and a previous gain value for each consecutive frame from the audio signal when the SNR is beyond the threshold; and
applying the updated stored gain value to a descendant of the audio signal when the SNR is not beyond the threshold, and wherein the stored gain value is not updated when the SNR is not beyond the threshold.

9. The at least one machine readable medium of claim 8, wherein the operations of obtaining the audio signal, deriving the SNR, comparing the SNR to the threshold, and updating the stored gain value or applying the stored gain value are applied for sample frames from the audio signal.

10. The at least one machine readable medium of claim 9, wherein the application to the sample frames is sequential.

11. The at least one machine readable medium of claim 8, wherein deriving the SNR from the audio signal includes calculating a noise floor power spectral density (PSD) and a speech level PSD.

12. The at least one machine readable medium of claim 11, wherein the PSDs are limited to a speech frequency bandwidth.

13. The at least one machine readable medium of claim 12, wherein the speech frequency bandwidth is defined by set of frequency bin parameters, b_min representing a lower frequency bin and b_max representing a higher frequency bin, the PSD applied to frequency bins between b_min and b_max inclusively.

14. The at least one machine readable medium of claim 11, wherein the operations include deriving an available gain headroom including using a full-wave rectifier in combination with an auto-regressive average to obtain a peak signal level (PSL).

15. The at least one machine readable medium of claim 14, wherein a time frame for obtaining the PSD is scaled by a gain determined by processing a previous signal frame.

16. The at least one machine readable medium of claim 8, wherein the threshold is selected from a plurality of thresholds.

17. The at least one machine readable medium of claim 8, wherein updating the stored gain value includes storing a previous value of the gain plus a current gain headroom value.

18. A method for automatic gain control for speech recognition, the method comprising:
obtaining an audio signal;
deriving a signal-to-noise ratio (SNR) from the audio signal;
comparing the SNR to a threshold;
updating a single stored gain value and refraining from applying the updated stored gain value when the SNR is beyond the threshold, wherein updating the stored gain value includes storing a time-smoothed result of an addition of a gain headroom value and a previous gain value for each consecutive frame from the audio signal when the SNR is beyond the threshold; and
applying the updated stored gain value to a descendant of the audio signal when the SNR is not beyond the threshold, and wherein the stored gain value is not updated when the SNR is not beyond the threshold.

19. The method of claim 18, wherein deriving the SNR from the audio signal includes calculating a noise floor power spectral density (PSD) and a speech level PSD.

20. The method of claim 19, wherein the PSDs are limited to a speech frequency bandwidth.

21. The method of claim 20, wherein the speech frequency bandwidth is defined by set of frequency bin parameters, b_min representing a lower frequency bin and b_max representing a higher frequency bin, the PSD applied to frequency bins between b_min and b_max inclusively.

22. The method of claim 19, comprising deriving an available gain headroom including using a full-wave rectifier in combination with an auto-regressive average to obtain a peak signal level (PSL).

23. The method of claim 22, wherein a time frame for obtaining the PSD is scaled by a gain determined by processing a previous signal frame.

24. The method of claim 18, wherein updating the stored gain value includes storing a previous value of the gain plus a current gain headroom value.

* * * * *